June 25, 1935.    V. NODIÈRE    2,006,276
SAFETY BOLT
Filed Nov. 27, 1933
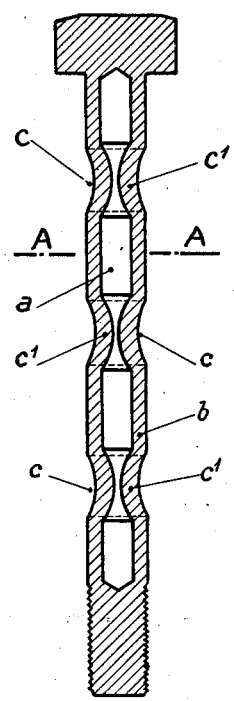
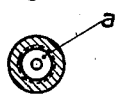
Inventor
Victor Nodière,
By William C. Linton.
Attorney.

Patented June 25, 1935

2,006,276

UNITED STATES PATENT OFFICE 2,006,276

SAFETY BOLT

Victor Nodière, Saint-Etienne, France

Application November 27, 1933, Serial No. 699,992
In Germany December 3, 1932

3 Claims. (Cl. 85—1)

My invention relates to the unscrewing of nuts on bolts as in screwed unions and consists primarily in increasing the extent of the elastic deformation or resiliency of the bolt, so that the nuts will be retained much more securely on the bolt when it is subjected to vibration in an operating machine, as on motor vehicles.

An object of my invention is to provide a threaded bolt of such structure and design as will permit the bolt to yield elastically and resiliently under applied vibration without exceeding the elastic limit of the material of the bolt and without permanent deformation of the bolt, so that the nut is at all times held tight against its seat and is not loosened so that it will unscrew.

I employ a bolt with hollow unthreaded shank provided with circumferential depressed ring portions of varying wall thickness spaced by intermediate portions whose surface is parallel to the bolt axis. The central bore of the parallel intermediate portions, and the cross section of the ring portions, are both so designed that for all axial points of the bolt the cross-sectional area of the unthreaded portion equals the cross-sectional area carried by the core of the threaded portion measured between the deepest points of the threads.

It is possible to prevent undesired unscrewing of the nut from the bolt without straining the bolt beyond its elastic limit, provided that the bolt is provided with a sufficiently yielding structure adapted to resist in all cases the forces produced by the vibration of the assembled parts and which tend to unscrew the nut.

Practical experiments have shown that the force tending to cause the unscrewing of a nut on a bolt is given by the formula $$R_d = \tfrac{1}{2}\frac{MV^2}{K}$$

where M is the mass or weight of the vibrating parts, V is the mean instantaneous speed, and K is the elastic elongation of the bolt. For an ordinary standard bolt K has a predetermined definite value; if a special design is provided for giving K a value ten or twenty times greater, the forces tending to cause unscrewing will be ten or twenty times smaller; it is therefore possible to avoid stressing the bolt beyond its elastic limit; consequently there is no permanent deformation and no unscrewing of the nut from the bolt.

In brief, the conditions preventing un screwing of nuts from bolts holding vibrating parts together may be summarized as follows:

The force $R_d$ causing the unscrewing is equal to $$\tfrac{1}{2}\frac{MV^2}{K}$$

as stated above. For a bolt cross-section equal to S, and a unitary elastic resistance of the bolt equal to $R_e$, the elastic resistance of the bolt $R_eS$, and to keep within the elastic limit it is necessary that $$R_d \leq R_e S$$

Considering a given ordinary bolt having an outer diameter D, and having a diameter $d$ measured at the deepest point of its thread, the cross-sections corresponding to S are respectively proportional to $D^2$ and $d^2$. Now, during the operation of screwing the nut on the bolt tightly, the inner cross-section $d^2$ alone may reach its elastic limit, and never the outer cross-section $D^2$, which fact determines the effective values of $R_eS$ and $R_d$.

An object of my invention is to increase this ratio $$\frac{d^2}{D^2}$$

so as to bring it near to 1, whereas, for instance, in the international thread system, it is only equal to about 0.66. The effective valve of $R_eS$ will thus be made as large as possible. Referring to the above formula relative to the force $R_d$ and the conditions preventing unscrewing, increasing the value of $$\frac{d^2}{D^2}$$

towards unity will increase in the same proportion the elastic deformation K.

This first desired result is achieved by designing the bolt with a longitudinal cross-section such that the cross-sectional area at the deepest point of the thread is equal to the cross-sectional area of the body or unthreaded shank of the bolt.

As a second feature, it is also possible to further increase the value of the elastic deformation of the bolt by designing the bolt with a specially shaped longitudinal cross-section of a figure such as will allow an elastic deformation which is higher than that which the metal will allow with ordinary shapes.

My invention has for a further object the provision of a bolt in which there are simultaneously applied in cooperation these means which have been mentioned for increasing the elastic deformation, the product being such that it looks like an ordinary bolt regularly used in practice.

In order to satisfy the first above-mentioned condition, the cross-section of the unthreaded body or shank of the bolt is reduced to a value equal to the cross-section of the core of the threaded portion measured between the deepest points of the thread by providing an axial bore through the unthreaded shank. In order to satisfy the second condition for increasing the elastic deformation I provide annular grooves or depressions in order to modify the linearity of the mid-fibre along the length of the bolt, that is, the mid-fibre of the shank wall, and to give it a wavy or undulatory shape at certain points which allows it to yieldingly stretch to a greater extent than if it were a straight line.

As an example, the structure of a bolt according to my invention is shown in the accompanying drawing.

Fig. 1 is a longitudinal cross-section of the improved form of bolt of my invention, showing the hollow shank and the depressed ring portions of special design.

Fig. 2 is a transverse cross-section along the line A—A of Fig. 1

Along the axis of the bolt b and throughout the length of its body or shank, a bore a is provided which in itself in the parallel portions of the shank reduces the cross-sectional area of the unthreaded body or shank to a value equal to that of the core of the threaded portion, measured between the deepest points of the threads, the outer diameter of the shank remaining the same as the outer diameter of this threaded portion. This unthreaded shank of the bolt is provided with annular grooves or depressions c which form ring portions c' and modify the linearity of the mid-fibre along the length of the bolt and give it a wavy shape such that this mid-fibre stretches yieldingly to a greater extent than if it were linear. However, for achieving the desired result above set forth it is necessary to maintain the cross-sections of the bolt at different points of its length at the same value, to satisfy the first condition abovementioned, as shown by the preceding equations and discussions. This result is obtained, as may be seen in Fig. 1, by giving the ring portions c' a thickness which increases gradually as their outer diameter diminishes. It will be noted that the curvilinear boundaries of the section of the ring portions c' have their centers of curvature outside the bolt, and that they have fairly sharp curvature and comparatively short radii of curvature.

It is also possible to increase the value of the elastic deformation by using a very yielding steel.

Experimental observations made have proved that in the case of a bolt designed according to my invention, the coefficient of elastic deformation could be brought to reach about 20. Consequently it is very easy to satisfy the conditions required for preventing unscrewing of the nut from the bolt, and it is thus possible to reduce substantially, inside certain limits, the cross-section of the bolt to meet given conditions, which allows in its turn a reduction in the weight of the vibrating parts.

It is obvious that modifications embodying the spirit of my invention will be apparent to those skilled in the art, which modifications are comprised within my invention, and I intend no limitation upon the scope of my invention other than as set forth in the appended claims.

I claim:

1. A resilient threaded bolt which will retain its nut under vibration having a threaded portion and a shank, said shank being provided with a central bore, said shank being further provided with spaced depressed ring portions having sharply curvilinear cross-sectional boundaries in the general direction of the axis of said bolt, the centers of curvature of said curvilinear boundaries being outside said bolt, said ring portions having a wall of thickness which increases from a minimum value at the point of maximum diameter of said ring portion to a maximum value at the point of minimum diameter of said ring portion.

2. A resilient threaded bolt which will retain its nut under vibration having a threaded portion and a shank, said shank being centrally apertured and having depressed ring portions having curvilinear cross-sectional boundaries in the general direction of the axis of said bolt, said ring portions having a wall of thickness increasing from a minimum value at the point of maximum diameter of said ring portions to a maximum value at the point of minimum diameter of said ring portions in such manner that the transverse cross-sectional area of the wall of said ring portions is for all axial points of said bolt substantially equal to the transverse cross-sectional area of said threaded portion measured between the deepest points of the threads thereof.

3. An elastic threaded bolt which will retain its nut under vibration having a threaded terminal portion and a shank, said shank being centrally apertured and having depressed ring portions spaced by intermediate rectilinear portions whose surfaces are substantially parallel to the axis of said bolt, said rectilinear portions being provided with a central bore of such diameter that the transverse cross-sectional area of the wall of said rectilinear portions is substantially equal to the transverse cross-sectional area of said threaded portion measured between the deepest points of the threads thereof, said depressed ring portions having curvilinear cross-sectional boundaries in the general direction of the axis of said bolt, said ring portions having a wall of thickness increasing from a minimum value at the point of maximum diameter of said ring poriton to a maximum value at the point of minimum diameter of said ring portion in such manner that the transverse cross-sectional area of the wall of said ring portion is for all axial points of said bolt substantially equal to the transverse cross-sectional area of said threaded portion measured between the deepest points of the threads thereof.

VICTOR NODIÈRE.